United States Patent
Jo et al.

(10) Patent No.: US 8,154,610 B2
(45) Date of Patent: Apr. 10, 2012

(54) IMAGE SENSOR WITH BUILT-IN ISP AND DUAL CAMERA SYSTEM

(75) Inventors: Young-Mi Jo, Cheongju (KR); Chae-Sung Kim, Cheongju-si (KR)

(73) Assignee: Intellectual Ventures II LLC, Wilmington, DE (US)

( * ) Notice: Subject to any disclaimer, the term of this patent is extended or adjusted under 35 U.S.C. 154(b) by 742 days.

(21) Appl. No.: 11/323,371

(22) Filed: Dec. 29, 2005

(65) Prior Publication Data

US 2006/0146152 A1 Jul. 6, 2006

(30) Foreign Application Priority Data

Dec. 30, 2004 (KR) .................. 10-2004-0116836

(51) Int. Cl.
*H04N 5/232* (2006.01)
(52) U.S. Cl. ............. 348/211.3; 348/222.1; 348/207.99; 348/14.01; 348/14.02
(58) Field of Classification Search .............. 348/211.3
See application file for complete search history.

(56) References Cited

U.S. PATENT DOCUMENTS

| | | | |
|---|---|---|---|
| 6,288,742 B1 * | 9/2001 | Ansari et al. | 348/211.14 |
| 6,552,746 B1 * | 4/2003 | Yang et al. | 348/308 |
| 6,977,685 B1 * | 12/2005 | Acosta-Serafini et al. | 348/308 |
| 7,092,015 B1 * | 8/2006 | Sogawa | 348/222.1 |
| 2002/0170039 A1 * | 11/2002 | Kovacevic | 717/138 |
| 2003/0020814 A1 * | 1/2003 | Ono | 348/220.1 |
| 2004/0119828 A1 * | 6/2004 | Silverbrook | 348/207.2 |
| 2007/0070204 A1 * | 3/2007 | Mentzer | 348/207.99 |

FOREIGN PATENT DOCUMENTS

| | | |
|---|---|---|
| JP | 01-175070 | 12/1989 |
| JP | 07-007653 | 10/1995 |
| JP | 07007653 A | 10/1995 |
| JP | 2000-353800 | 12/2000 |
| JP | 2002-232773 | 8/2002 |
| JP | 2004-253731 | 9/2004 |
| KR | 1020030091549 A | 3/2003 |
| KR | 10-2004-0116836 | 12/2004 |

OTHER PUBLICATIONS

English summary of the Office Action dispatched on Jul. 27, 2010 in corresponding Japanese application—JP2005-379711 (Non-certified translation).
JPU-1-175070 in Japanese language.
English summary of the JPO Final Office Action dispatched Sep. 9, 2011 and corresponding Japanese application—JP2005-379711 (Non-certified translation).
English translation of Abstract of JPU-1-175070 (Non-certified translation).

* cited by examiner

*Primary Examiner* — Sinh Tran
*Assistant Examiner* — Paul Berardesca
(74) *Attorney, Agent, or Firm* — McAndrews, Held & Malloy Ltd.

(57) ABSTRACT

A dual camera system includes a first bayer sensor block for outputting an external bayer image data constituted with photosensitive values of respective photosensitive cells which are sensitive to an incident light and a data processing unit, including a second bayer sensor block for outputting an internal bayer image data, for converting the external and the internal bayer image data into an image frame data with a predetermined format.

15 Claims, 2 Drawing Sheets

IMAGE SENSOR WITH BUILT-IN ISP AND DUAL CAMERA SYSTEM

CROSS-REFERENCE TO RELATED APPLICATION

The present application claims priority under 35 U.S.C. §119(e) to Korean Patent Application 2004-0116836, filed Dec. 30, 2004, which is hereby incorporated by reference in its entirety.

FIELD OF THE INVENTION

The present invention relates to a dual camera system having two image sensor or more; and more particularly, to an image sensor with a built-in ISP, and a dual camera system having the same.

DESCRIPTION OF RELATED ARTS

As a camera phone, i.e., a mobile phone having a digital camera function built-in, has been popularized nowadays, various methods for mounting an image sensor in the mobile phone have been performed. Among theses, there is introduced a dual camera system in which two image sensors are mounted in one mobile phone.

Though the dual camera system has a drawback that the image sensors are doubly installed, this dual camera system may be effectively applied to following cases.

First, a user utilizes the camera phone as a self-camera to take an image of oneself, or uses it as a typical digital camera to take an image of objects or landscape. Therefore, the camera phone may include an image sensor for the self-camera and another image sensor for the typical digital camera according to an implementation method of the mobile phone.

Second, the camera phone may be configured with a plurality of image sensors in which focal points are fixed to specific focal points according to focal lengths of the objects which will be photographed by the camera phone. However, this case may be used if the cost is lower than the cost for a case of using a lens driving module.

Third, the focal length fixed to a specific value without an additional lens driving module, tends to be lengthened as a resolution of the camera phone becomes great. In order to capture the image within a short focal length, a low-resolution image sensor with the fixed focal length may be separately included in the camera phone.

Meanwhile, a semiconductor device incorporating early CMOS image sensors, which is referred to as a sensor chip hereinafter, includes only a bayer sensor module outputting a bayer data composed of a luminance value of each photosensitive cell which simply serves a role of red (R), green (G), and blue (B). In an image signal processor (ISP) chip, which is separately formed from the sensor chip, the bayer data is inputted thereto and is converted into a frame data which is usable for a general image information processing system. However, as the semiconductor device becomes highly integrated, there is proposed the image sensor chip in which the bayer sensor module and the ISP module are integrated in one chip coincidently.

One of methods for embodying the dual camera system using the image sensor chip as stated above, is to employ two bayer sensor module chips and one ISP chip. The other method is to employ two sensor chips with a built-in ISP, wherein the bayer sensor module and the ISP module are integrated in the sensor chip with the built-in ISP.

However, the former method has a demerit that the cost and the fabrication expense are too high because there are employed three chips. Meanwhile, the latter method is also a disadvantage that two ISP modules are employed, and thus one ISP is excessively used.

SUMMARY OF THE INVENTION

It is, therefore, an object of the present invention to provide a dual camera system configuring one sensor chip with one-chip type and one bayer sensor chip.

It is, therefore, another object of the present invention to provide an image sensor with a built-in ISP in which the built-in ISP module is capable of performing an image processing on a bayer data inputted from an exterior as well as a built-in bayer sensor module.

In accordance with an aspect of the present invention, there is provided an image sensor with a dual camera system, including: a first bayer sensor block for outputting an external bayer image data constituted with photosensitive values of respective photosensitive cells which are sensitive to an incident light; and a data processing unit, including a second bayer sensor block for outputting an internal bayer image data, for converting the external and the internal bayer image data into an image frame data with a predetermined format.

In accordance with another aspect of the present invention, there is provided a dual camera system including: a sub image sensor for outputting an external bayer image data which is went through a predetermined process; and an image sensor with a built-in ISP, including a first bayer image sensor block for outputting a first bayer image data, for converting the external and the first bayer image data into an image frame data with a predetermined format.

BRIEF DESCRIPTION OF THE DRAWINGS

The above and other objects and features of the present invention will become better understood with respect to the following description of the preferred embodiments given in conjunction with the accompanying drawings, in which.

DETAILED DESCRIPTION OF THE INVENTION

An image sensor with a built-in ISP and a dual camera system in accordance with exemplary embodiments of the present invention will be described in detail with reference to the accompanying drawings.

Figure 1:
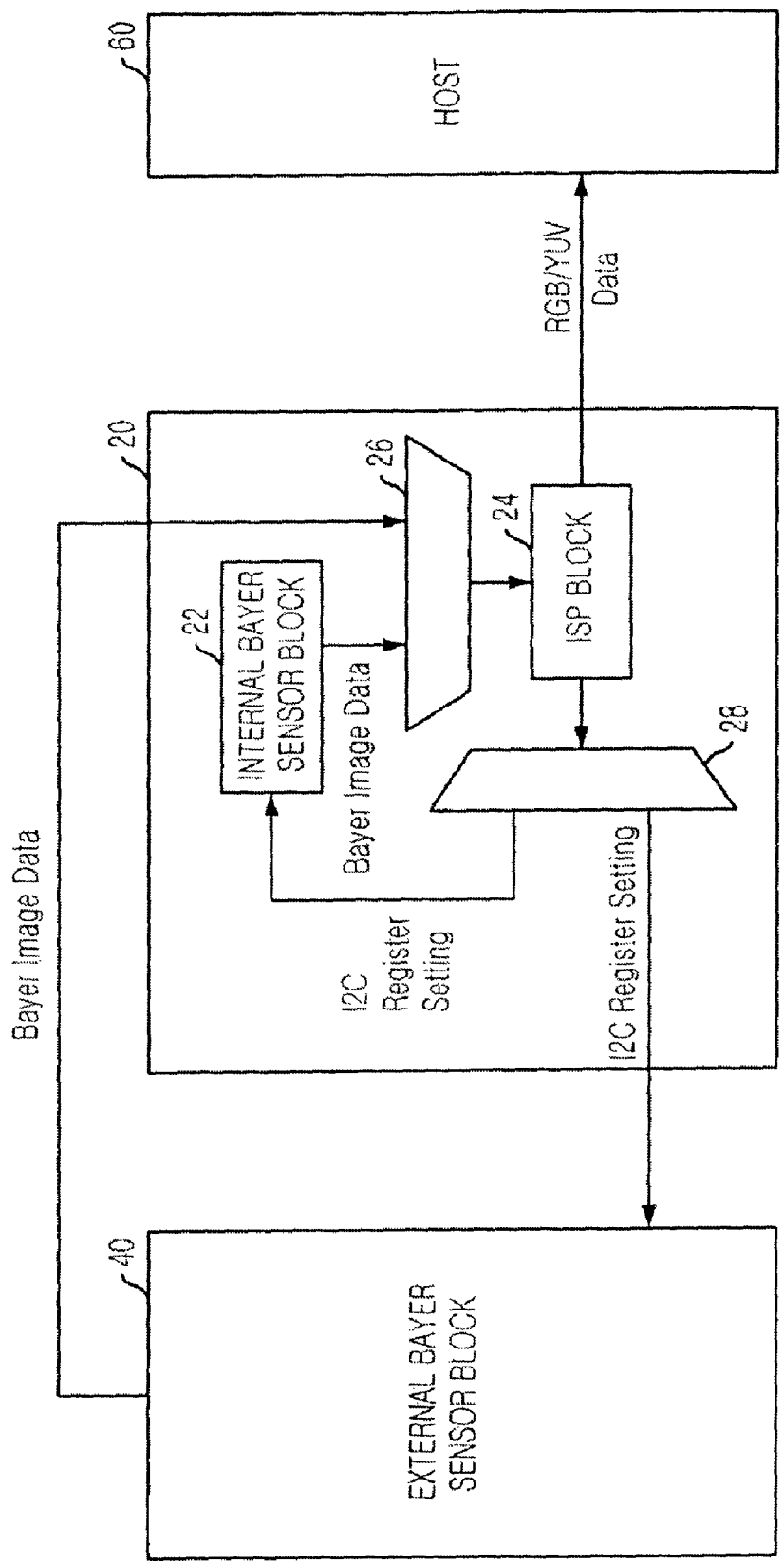
FIG. 1 is a block diagram setting forth an image sensor with a built-in image signal processor (ISP) and a dual camera system in accordance with a first embodiment of the present invention.

FIG. 1 is a block diagram setting forth an image sensor with a built-in image signal processor (ISP) and a dual camera system in accordance with a first embodiment of the present invention.

Referring to FIG. 1, the image sensor 20 with a built-in ISP includes an internal bayer sensor block 22 for outputting a bayer image data composed of photosensitive values of respective photosensitive cells which are sensitive to an incident light; an ISP block 24 for receiving the bayer image data to convert it into an image frame RGB/YUV data with a predetermined format and outputting the image frame RGB/YUV data to an external host 60, wherein the ISP block 24 outputs a control data for a bayer sensor; a bayer pathway selector 26 for selecting one of the internal bayer sensor block 22 and an external image sensor 40 to be a source of the bayer image data inputted to the ISP block 24; and a control pathway selector 28 for selecting one of the internal bayer sensor block 22 and the external image sensor 40 to which the control data outputted from the ISP block 24 is transferred.

The internal bayer sensor block 22 includes a matrix composed of the photosensitive cells. In detail, the matrix is configured with green, red and blue photosensitive cells for photo-sensing green light, red light, and blue light, respectively. The bayer image data outputted from the internal bayer sensor block 22 is composed of the photosensitive values in proportional to the intensity of the light that each photosensitive cell senses. Herein, the photosensitive value for one pixel is recorded as information about only one light among red, green and blue light.

The ISP block 24 generates the image frame RGB/YUV data having a predetermined standard format by converting the bayer image data. Herein, the image frame RGB/YUV data has a predetermined resolution and each pixel data has information for all the red, green, and blue light. In addition, the ISP block 24 performs various corrections, e.g., an auto-exposure, an auto white balance, an anti-flicker elimination or the like, as well as an interpolation, and further performs a function of providing an image effect. Therefore, it is possible to configure the image sensor having an enhanced image quality and expediency.

The bayer pathway selector 26 selects the bayer data which the ISP block 24 will process, between the bayer data generated at the internal bayer sensor block 22 or the bayer data inputted from the exterior of the sensor chip 20. Thus, the bayer pathway selector 26 may be configured with a kind of a multiplexer. To this end, the image sensor chip 20 with the built-in ISP further includes a bayer data input terminal with a serial or parallel data input interface fashion for receiving the bayer image data from the external image sensor 40.

In a general image sensor chip, the ISP block records a data having a predetermined command on a control register for storing the control data in the internal bayer sensor block. The internal bayer sensor block performs an operation corresponding to the data recorded at the control register so that the internal bayer sensor block is controlled by the ISP block. If applying an idea of the present invention to the general image sensor chip 20, the control pathway selector 28 selects one of the internal bayer sensor block 22 and the external image sensor 40 to which the control data, i.e., the value to be recorded in the control register, which is outputted from the ISP block 24, will be transferred. That is, the control of the external image sensor 40 using the control register may be performed by the ISP block 24. To this end, the image sensor chip 20 of the first embodiment further includes an I2C interface for externally inputting/outputting the control data. Under certain implementations, the control pathway selector 28 may transfer the control data to both the internal bayer sensor block 22 and the external image sensor 40 coincidently.

A dual camera system includes the image sensor chip 20 with the built-in ISP; and the external image sensor 40, for outputting a bayer data to the image sensor chip 20 with the built-in ISP, and receiving a control data from the image sensor chip 20 with the built-in ISP to record the control data on an internal control register. The external image sensor 40 may be a bayer image sensor in which an ISP block does not exit at all, or an image sensor in which the ISP block exists but is disabled. Herein, the latter is a case that the function of the ISP block in the external image sensor 40 is not performed in order to use a powerful function of the enabled ISP block, because the function of the built-in ISP block of the image sensor is inferior to that of a relatively enabled ISP block.

When performing photographing by means of the image sensor chip 20 with the built-in ISP, the photographing procedure is performed similar to that of the conventional image sensor. Meanwhile, when performing photographing by means of the external image sensor 40, the bayer image data outputted from the external image sensor 40 is transferred to the image sensor chip 20 with the built-in ISP and the image sensor chip 20 with the built-in ISP converts the transferred bayer image data into the image frame RGB/YUV data so as to output the image frame RGB/YUV data to the external host 60.

In addition, it is possible to configure the dual camera system in a structure where the image sensor chip 20 with the built-in ISP is connected to the I2C interface of the external image sensor 40. Therefore, the function such as the auto-exposure, the auto white balance, the anti-flicker elimination, or the like, which should be interlocked with an analog portion of the sensor, may be performed by the image sensor chip 20 with the built-in ISP. That is, the image sensor chip 20 with the built-in ISP as an image processing host may read/write a predetermined data from/to the control register of the external image sensor without the ISP block or with the disabled ISP block, thereby performing the above functions.

Figure 2:
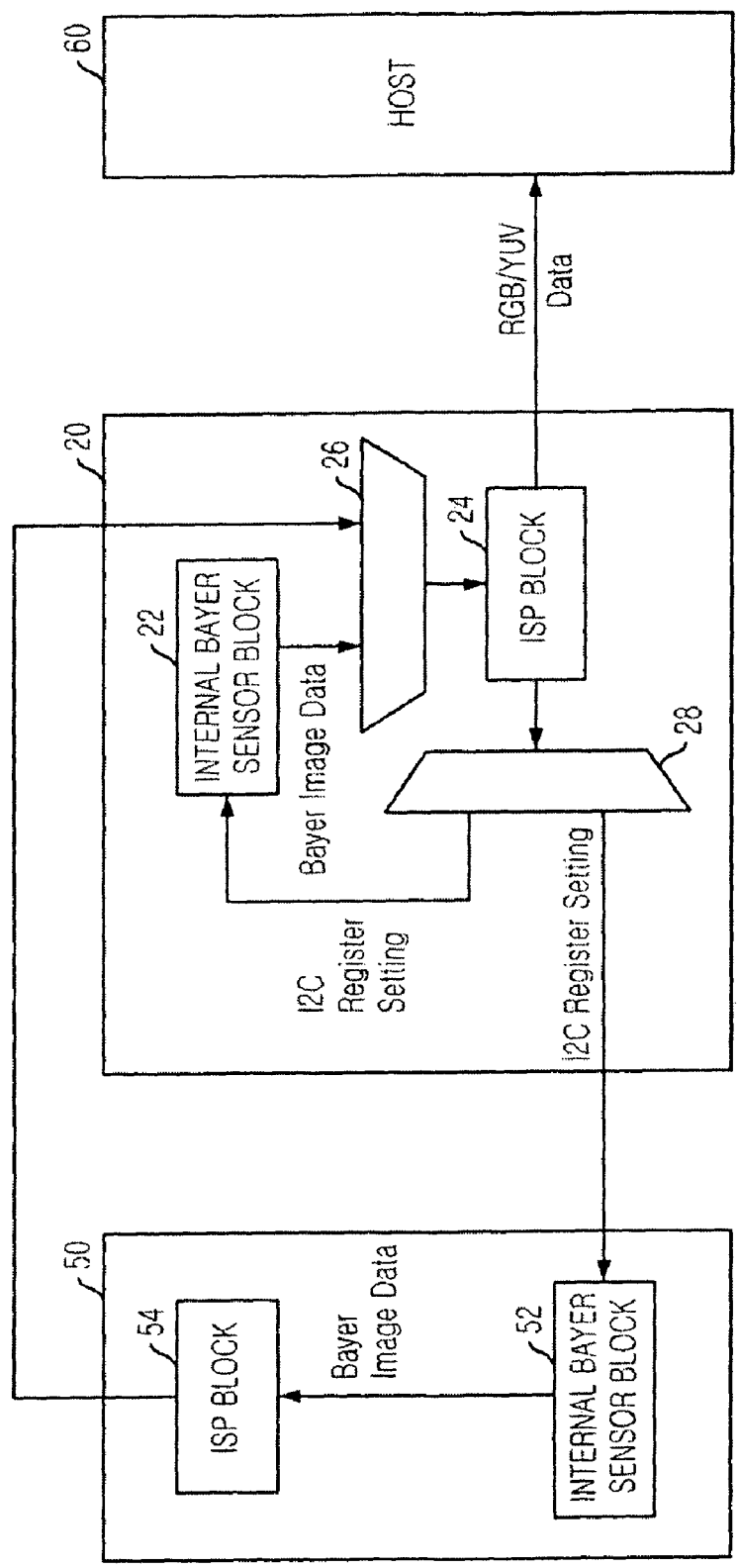
FIG. 2 is a block diagram setting forth an image sensor with a built-in ISP and a dual camera system in accordance with a second embodiment of the present invention.

FIG. 2 is a block diagram setting forth an image sensor chip 20 with a built-in ISP and a dual camera system in accordance with a second embodiment of the present invention.

Referring to FIG. 2, the image sensor chip 20 with the built-in ISP includes an internal bayer sensor block 22 for outputting a bayer image data composed of photosensitive values of respective photosensitive cells which are sensitive to an incident light; an ISP block 24 for receiving the bayer image data to convert it into an image frame RGB/YUV data with a predetermined format and outputting the image frame RGB/YUV data to an external host 60, wherein the ISP block 24 outputs a control data for a sub image sensor 50; an input pathway selector 26 for selecting a data inputted into the ISP block 24 between the bayer image data generated at the internal bayer sensor block 22 and the image frame RGB/YUV data with the predetermined format outputted from the sub image sensor 50; and a control pathway selector for selecting one of the internal bayer sensor block 22 and the sub image sensor 50 which the control data outputted from the ISP block 24 is transferred.

The internal bayer sensor block 22 of the second embodiment is identical to that of the first embodiment.

The ISP block 24 generates the image frame data having a predetermined standard format by converting the bayer image data. Herein, the image frame data has a predetermined resolution and each pixel data has information for all the red, green, and blue light.

In the second embodiment, the ISP block 54 in the external image sensor 50 takes charge of converting the bayer image data of the external image sensor 50 into the RGB/YUV image frame data, whereas the ISP block 24 of the image sensor 20 with the built-in ISP provides the function such as the auto-exposure, the auto white balance, the anti-flicker elimination, or the like, to the external image sensor 50.

To this end, although the ISP block 24 may be configured to receive only an essential portion for the above function among the bayer image datum of the internal bayer sensor block 52 in the external image sensor 50, the image sensor 20 with the typical ISP block does not have an additional bayer data output terminal. Therefore, it is preferable that the image sensor 20 with the built-in ISP be configured to receive the RGB/YUV image frame data outputted from the ISP block 54. In this case, the ISP block 24 obtains needful information with regard to the function such as the auto-exposure, the auto white balance, the anti-flicker elimination, or the like, from the RGB/YUV data of the external sensor 50. Furthermore, in this case, the ISP block 24 receives the RGB/YUV data from the external sensor 50 and transfers the RGB/YUV data to the host 60.

Herein, the input pathway selector 26 plays a role in selecting the bayer data generated at the internal bayer sensor block 22 or the RGB/YUV image frame data generated at the external sensor 50, and transferring the selected data to the ISP block 24. Thus, the input pathway selector 26 may be configured with a kind of a multiplexer. To this end, the image sensor chip with the built-in ISP further includes an external data input terminal with a serial or parallel data input interface fashion for receiving the RGB/YUV image frame data from the external sensor 50.

In a general image sensor chip, the ISP block records a data having a predetermined command in a control register for storing the control data in the internal bayer sensor block. The internal bayer sensor block performs an operation corresponding to the recorded data of the control register so that the internal bayer sensor block is controlled by the ISP block. If applying an idea of the present invention to the general image sensor chip, the control pathway selector 28 selects one of the internal bayer sensor block 22 and the sub image sensor 50 to which the control data, i.e., the value to be recorded in the control register, which is outputted from the ISP block 24, will be transferred. To this end, the image sensor chip 20 with the built-in ISP further includes an I2C interface for externally inputting/outputting the control data. According to a predetermined implementation, the control pathway selector 28 may transfer the control data to both the internal bayer sensor block 22 and the sub image sensor 50 simultaneously. The bayer sensor block 52 of the sub sensor 50 may be controlled by both the ISP blocks 54 and 24 doubly if necessary. Meanwhile, this control method is performed through the control register so that the control may be performed according to the data recorded in the register finally.

A dual camera system includes the image sensor chip 20 with the built-in ISP; and a sub image sensor 50 for outputting an image frame data with a predetermined format to the image sensor chip 20 with the built-in ISP, and receiving a control data from the image sensor chip 20 with the built-in ISP to record the control data in an internal control register. Though the sub image sensor 50 has the ISP block 54, the sub image sensor 50 does not perform the function such as the auto-exposure, the auto white balance, the anti-flicker elimination but merely performs a conversion of a data format.

When performing photographing by means of the image sensor 20 with the built-in ISP, the photographing procedure is performed similar to that of the conventional image sensor. Meanwhile, when performing photographing by means of the sub image sensor 50, the RGB/YUV image frame data generated at the sub image sensor 50 is transferred to the host 60 via the image sensor 20 with the built-in ISP.

In addition, it is possible to configure the dual camera system in a structure where the image sensor 20 with the built-in ISP is connected to the I2C interface of the sub image sensor 50. Therefore, the function such as the auto-exposure, the auto white balance, the anti-flicker elimination, or the like, which should be interlocked with an analog portion of the sensor, may be performed by the image sensor 20 with the built-in ISP. That is, the image sensor 20 with the built-in ISP as an image processing host may read/write a predetermined data from/to the control register of the sub image sensor without the ISP block or with the disabled ISP block, thereby performing the above functions.

As described above, in accordance with the present invention, it is possible to manufacture a low-cost dual camera system configured with one sensor chip with one-chip type and one bayer sensor chip by using the image sensor with the built-in ISP.

The present application contains subject matter related to the Korean patent application No. KR 2004-116836, filed in the Korean Patent Office on Dec. 30, 2004, the entire contents of which being incorporated herein by reference.

While the present invention has been described with respect to certain preferred embodiments, it will be apparent to those skilled in the art that various changes and modifications may be made without departing from the spirit and scope of the invention as defined in the following claims.

What is claimed is:

1. A multi-sensor imaging system comprising:
  a first image sensor chip including a first image signal processor (ISP) and a first image sensor, wherein the first image sensor is configured to generate first raw image data for an image sensed by the first image sensor, wherein the first ISP is configured to convert raw image data into first formatted image frame data, and wherein each pixel data of the first formatted image frame data includes red, green, and blue color information;
  a second image sensor chip external to, and configured to communicate with, the first image sensor chip, wherein the second image sensor chip includes a second image sensor configured to generate second raw image data for an image sensed by the second image sensor and a second ISP configured to convert the second raw image data into second formatted image frame data, and wherein each pixel data of the second formatted image frame data includes red, green, and blue color information; and
  an image pathway selector on the first image sensor chip having a first input configured to receive the first raw image data and a second input configured to receive the second formatted image frame data, wherein the image pathway selector is configured to operate in:
    a first image switch mode in which the first raw image data is switched from the first input of the image pathway selector to an input of the first ISP to the exclusion of the second formatted image frame data; and
    a second image switch mode in which the second formatted image frame data from the second image sensor chip is switched from the second input of the image pathway selector to the input of the first ISP to the exclusion of the first raw image data;
  wherein the first ISP is further configured to:
    process the first raw image data acquired during the first image switch mode to generate formatted image frame data output; and
    process the second formatted image frame data acquired during the second image switch mode to generate the formatted image frame data output.

2. The multi-sensor imaging system of claim 1, wherein the first ISP is further configured to perform at least one of an auto-exposure, an auto white balance, or an anti-flicker elimination on the formatted image frame data acquired during the second image switch mode.

3. The multi-sensor imaging system of claim 1, further comprising a communication link connecting the first image sensor chip and the second image sensor chip, wherein the communication link includes an $I^2C$ bus.

4. The multi-sensor imaging system of claim 1, further comprising a host configured to receive the formatted image frame data output from a host interface configured on the first image sensor chip.

5. The multi-sensor imaging system of claim 1, wherein the image pathway selector is further configured as a multiplexer.

6. A multi-sensor imaging system comprising:
- a first image sensor chip including an image signal processor (ISP) and a first image sensor having a first control register configured to store control data used to control operation of the first image sensor, wherein the first image sensor is configured to generate first image data for an image sensed by the first image sensor;
- a second image sensor chip external to, and configured to communicate with, the first image sensor chip, wherein the second image sensor chip includes a second image sensor having a second control register configured to store control data used to control operation of the second image sensor, wherein the second image sensor chip is further configured to generate second image data for an image sensed by the second image sensor, wherein the first image data has a first image format and the second image data has a second image format, wherein the first image format and second image format have different image data types, and wherein the ISP is configured to process the different image data types to generate image frame data output;
- an image pathway selector on the first image sensor chip, wherein the image pathway selector includes a first input configured to receive the first image data and a second input configured to receive the second image data, wherein the image pathway selector is configured to operate in:
  - a first image switch mode in which the first image data at the first input is switched to an input of the ISP to the exclusion of the second image data; and
  - a second image switch mode in which the second image data at the second input is switched to the input of the ISP to the exclusion of the first image data at the second input; and
- a control pathway selector having an input configured to receive control data from the ISP, a first output configured to provide the control data at the input of the control pathway selector to the first image sensor for storage in the first control register, and a second output configured to provide the control data from the input of the control pathway selector to the second image sensor for storage in the second control register;
- wherein the control pathway selector is configured to operate in a first control switch mode in which the control data at the input of the control pathway selector is switched exclusively to the first image sensor for storage in the first control register; and
- wherein the control pathway selector is further configured to operate in a second control switch mode in which the control data at the input of the control pathway selector is switched exclusively to the second output of the control pathway selector for storage in the second control register.

7. The multi-sensor imaging system of claim 6, further comprising:
- a communication link connecting the first image sensor chip with the second image sensor chip and configured to transmit command data from the first image sensor chip for storage in a control register of the second image sensor.

8. The multi-sensor imaging system of claim 6, further comprising a communication link connecting the first image sensor chip and the second image sensor chip, wherein the communication link includes:
- a first communication port on the first image sensor chip;
- a second communication port on the second image sensor chip;
- a first communication bus connecting the first and second communication ports, wherein the first communication bus is configured to transmit the image data generated by the second image sensor chip to the first image sensor chip;
- a third communication port on the first image sensor chip;
- a fourth communication port on the second image sensor chip; and
- a second communication bus connecting the third and fourth communication ports, wherein the second communication bus is configured to transmit the control data from the first image sensor chip to the second image sensor chip;
- wherein the first communication port, the second communication port, and the first communication bus are configured to provide communication between the first image sensor chip and second image sensor chip independent of any communication between the first image sensor chip and second image sensor chip by the third communication port, the fourth communication port, and the second communication bus.

9. The multi-sensor imaging system of claim 6, wherein the first image data comprises first raw image data.

10. The multi-sensor imaging system of claim 9, wherein the first image data comprises Bayer image data.

11. The multi-sensor imaging system of claim 9, wherein the second image sensor is configured to generate raw image data, wherein the second image sensor chip further comprises another ISP configured to convert the raw image data from the second image sensor into the second image data, and wherein the second image data includes formatted image frame data in which each pixel data includes red, green, and blue color information.

12. The multi-sensor imaging system of claim 11, wherein the ISP of the first image sensor chip is further configured to perform at least one of an auto-exposure, an auto white balance, or an anti-flicker elimination on the second image data.

13. An image sensor chip comprising:
- an image sensor configured to generate raw image data for an image sensed by the image sensor;
- an image signal processor (ISP) configured to convert raw image data into internal formatted image frame data, wherein each pixel data of the internal formatted image frame data includes red, green, and blue color information, wherein the ISP is further configured to process externally provided formatted image frame data pursuant to generating the internal formatted image frame data from the externally provided formatted image frame data, and wherein each pixel data of the externally provided formatted image frame data includes red, green, and blue color information;
- a first communication port configured to transmit the internal formatted image frame data to an external processor;
- a second communication port configured to receive the externally provided formatted image frame data; and
- an image pathway selector having a first input configured to receive the externally provided formatted image frame data from the second communication port and a second input configured to receive the raw image data from the image sensor, wherein the image pathway selector is configured to operate in:
a first image switch mode in which the externally provided formatted image frame data is switched from the first input of the image pathway selector to an input of the ISP to the exclusion of the raw image data; and
a second image switch mode in which the raw image data is switched from the second input of the image pathway selector to the input of the ISP to the exclusion of the externally provided formatted image frame data.

14. The image sensor chip of claim 13, further comprising:
a control pathway selector having an input configured to receive control data from the ISP, a first output configured to provide the control data from the input of the control pathway selector to a control register of the image sensor, and a second output configured to provide the control data from the input of the control pathway selector to a third communication port, wherein the control data is stored in an image control register;
wherein the control pathway selector is configured to operate in a first control switch mode in which the control data at the input of the control pathway selector is switched exclusively to the image sensor; and
wherein the control pathway selector is further configured to operate in a second control switch mode in which the control data at the input of the control pathway selector is switched exclusively to the second output of the control pathway selector.

15. The image sensor chip of claim 13, wherein the raw image data comprises Bayer image data.

* * * * *

UNITED STATES PATENT AND TRADEMARK OFFICE
CERTIFICATE OF CORRECTION

| | |
|---|---|
| PATENT NO. | : 8,154,610 B2 |
| APPLICATION NO. | : 11/323371 |
| DATED | : April 10, 2012 |
| INVENTOR(S) | : Jo et al. |

It is certified that error appears in the above-identified patent and that said Letters Patent is hereby corrected as shown below:

On the Title Page: Item (75), under "Inventors", in Column 1, Line 1, delete "Cheongju" and insert -- Cheongju-si --, therefor.

IN THE SPECIFICATIONS:

In Column 2, Line 59, delete "sensor 20" and insert -- sensor chip 20 --, therefor.

In Column 3, Line 64, delete "exit" and insert -- exist --, therefor.

In Column 4, Line 53, delete "external" and insert -- sub --, therefor.

In Column 4, Line 55, delete "external" and insert -- sub --, therefor.

In Column 4, Line 57, delete "20" and insert -- chip 20 --, therefor.

In Column 4, Line 57, delete "external" and insert -- sub --, therefor.

In Column 4, Line 63, delete "external" and insert -- sub --, therefor.

In Column 4, Line 63, delete "20" and insert -- chip 20 --, therefor.

In Column 4, Line 66, delete "20" and insert -- chip 20 --, therefor.

In Column 5, Line 4, delete "RGB/YUV data" and insert -- RGB/YUV image frame data --, therefor.

In Column 5, Line 4, delete "external" and insert -- sub image --, therefor.

In Column 5, Line 6, delete "external" and insert -- sub image --, therefor.

Signed and Sealed this
Twenty-fifth Day of September, 2012

David J. Kappos
*Director of the United States Patent and Trademark Office*

CERTIFICATE OF CORRECTION (continued)
U.S. Pat. No. 8,154,610 B2

In Column 5, Line 6, delete "RGB/YUV data" and insert -- RGB/YUV image frame data --, therefor.

In Column 5, Line 7, delete "host" and insert -- external host --, therefor.

In Column 5, Lines 10-11, delete "external" and insert -- sub image --, therefor.

In Column 5, Line 14, delete "chip" and insert -- chip 20 --, therefor.

In Column 5, Line 17, delete "external" and insert -- sub image --, therefor.

In Column 5, Line 36, delete "sub sensor" and insert -- sub image sensor --, therefor.

In Column 5, Line 52, delete "20" and insert -- chip 20 --, therefor.

In Column 5, Line 56, delete "host" and insert -- external host --, therefor.

In Column 5, Line 57, delete "20" and insert -- chip 20 --, therefor.

In Column 5, Line 59, delete "20" and insert -- chip 20 --, therefor.

In Column 5, Line 64, delete "20" and insert -- chip 20 --, therefor.

In Column 5, Line 65, delete "20" and insert -- chip 20 --, therefor.